June 26, 1928.
D. DYRESEN
1,675,097
FASTENER
Filed June 14, 1924
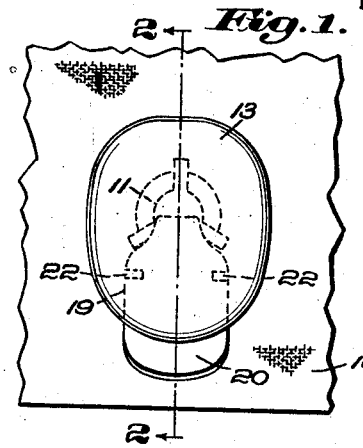
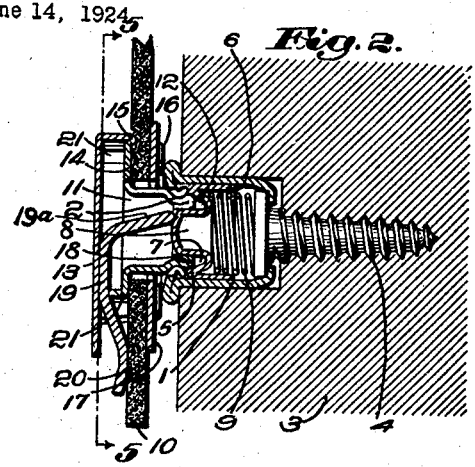
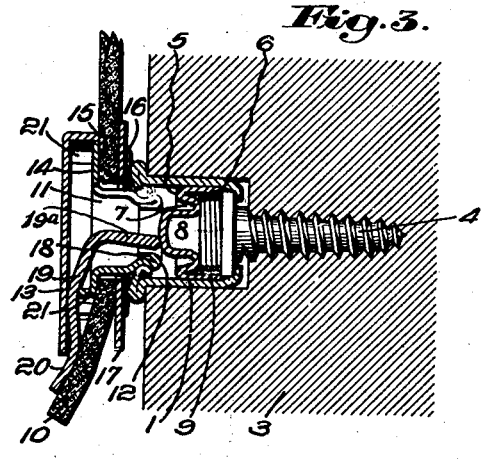
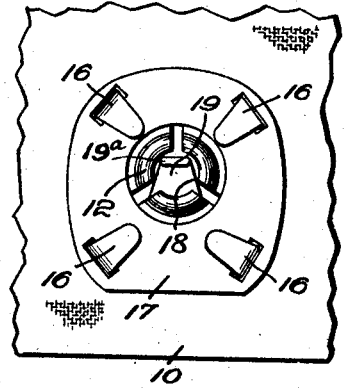
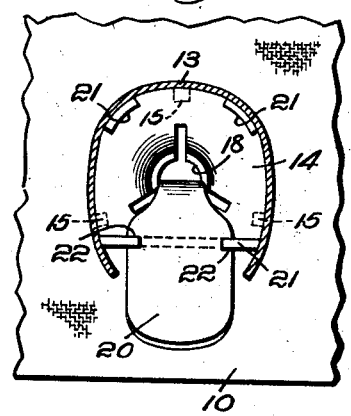
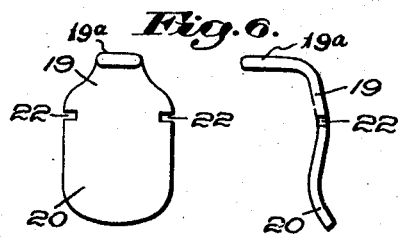
Inventor:
Didrick Dyersen, Patented June 26, 1928.

1,675,097

UNITED STATES PATENT OFFICE.

DIDRICK DYRESEN, OF MALDEN, MASSACHUSETTS.

FASTENER.

Application filed June 14, 1924. Serial No. 719,935.

This invention aims to provide improvements in a separable fastener.

In the drawings, which illustrate a preferred embodiment of my invention:—

Figure 1 is a front elevation of the device;

Fig. 2 is a section on the line 2—2 of Fig. 1, being partly in elevation;

Fig. 3 is a section similar to Fig. 2, but showing the stud unlocked prior to disengagement from the socket;

Fig. 4 is a rear elevation of the stud.

Fig. 5 is a section on the line 5—5 of Fig. 2; and

Fig. 6 is a front elevation and side elevation, respectively, of the latch member.

In fasteners as previously constructed, great difficulty has been experienced in combining simplicity of construction, reliability, and facility of operation. One well-known fastener presents a flush type socket for application to an automobile body, a resilient stud for application to the curtain, a locking part carried by the stud for locking the head of the stud in expanded position and a press button for moving the locking part out of its locking position. Another fastener is the same as that just described, except that the locking part is carried by the socket. In the present disclosure, I have elected to illustrate the latter type of locking part, though various features of my invention are new and useful irrespective of the type of locking part used.

In the embodiment of my invention illustrated, the construction is simple, reliable and for many purposes can be operated with greater facility than is the case with fasteners presenting push-buttons, pull-knobs and other similar manipulatory unlocking devices.

Referring to the embodiment of the invention illustrated in the drawings, I have shown a flush type socket including a casing 1 presenting a stud-receiving aperture 2 and secured to the body 3 of an automobile, or like support, by an attaching screw 4. As thus far described, the socket is substantially as shown and described in the co-pending application to Andrew S. Anderson, Serial No. 708,724, filed April 24th, 1924.

Within the socket (Figs. 2 and 3), I have provided a combined sealing and locking part 5 presenting a locking extension for cooperation with a stud. I prefer that this combined sealing and locking part shall, as shown, present a tubular part 6 slidable within the casing to provide a substantial bearing for the rest of the sealing part 5. The outer end of the sealing part 5 is first pressed inwardly to form a depressed portion 7 and then outwardly to provide a relatively long round-headed locking portion 8 for locking a stud with the socket. The sealing part is normally pressed into aperture-closing position by a spring 9, and the locking portion 8 protrudes into the stud-receiving aperture 2. Thus a sealing and locking part is provided in the socket which, because of its rounded head, is easily registerable with the head of a stud and cannot tip relative to the casing because of the long bearing surface against the inside of the casing; thereby insuring positive locking means for locking a stud with the socket.

The stud, as illustrated, is secured to the curtain 10 of an automobile or the like and presents a socket-engaging part 11 having a plurality of longitudinal slots to provide a contractible and expansible head 12 for engagement with the stud-receiving aperture 2 in the socket.

While the socket-engaging part 11 may be secured to the curtain 10, in any suitable manner, I have secured it thereto by first securing a front plate 13 to the base 14 of the socket-engaging part 11 by a plurality of short prongs 15 (Figs. 2, 3 and 5), which are clenched over the periphery of the base 14 and onto the adjacent face thereof. The front plate 13 also presents a plurality of long prongs 16 which pass through the curtain 10, through slots in a back plate 17 located at the opposite face of the curtain and are then clenched inwardly against the face of the back plate 17, as illustrated in Figs. 2 and 4. Thus the stud is secured to that side of the curtain opposite the side facing the socket and presents a socket-engaging part 11 which passes through the curtain 10 and the back plate 17 and presents a contractible and expansible head for locking engagement with the socket.

The locking portion 8 in the socket engages the inwardly bent portions 18 of the head of the stud to prevent contraction thereof. Thus the head of the stud is locked with the socket and can only be separated therefrom pursuant to displacement of the locking portion 8 from the head of the stud. To this end I have provided a shiftable part, herein the lever 19 pivoted between the base 14 of the socket-engaging part 11 (Figs. 2, 3 and 5) and the front plate 13. The lever 19 is adapted to operate an unlocking part 19ª which, in this instance, is shown as being formed integral with and presented at one end of the lever 19. The unlocking portion 19ª is located within the stud for engagement with and operation of the locking portion 8. The lever 19 also presents a depending finger 20 extending toward the free edge of the curtain and operable to move the lever about the pivot to move the unlocking portion 19ª in such manner that it will displace the locking portion 8 from the head 12 of the stud.

The front plate 13 is spaced away from the base 14 of the socket-engaging part 11 by a plurality of struts 21 extending outwardly from the base 14, thus providing a space between the front plate 13 and curtain 10 to permit to and fro movement of the depending finger 20.

The unlocking portion 19ª of the lever 19 is relatively narrow at that end located at the head of the stud and gradually widens toward the point at which the lever is pivoted, thus providing a relatively wide bearing for the pivot and for the depending finger 20. The lever 19 including the portions 19ª and 20 may be considered broadly as releasing means.

Longitudinal movement of the lever relative to its pivot is prevented by providing two slots 22, 22 at the edges of the lever adjacent the point where the lever bears on the pivot, which engage two of the struts 21 which space the front plate 13 relative to the base 14 of the socket-engaging part 11, as best illustrated in Fig. 5.

While the front plate 13 could be constructed to cover the depending finger of the lever, I prefer to leave a portion of the finger 20 exposed below the edge of the front plate 13, so that the lever may be operated either by hand or preferably by pulling upon the curtain, as hereinafter more fully described.

The stud and socket may be engaged by pressing upon the front plate 13, thereby urging the head of the stud into the stud-receiving aperture 2 in the socket. As the head 12 contracts and enters the aperture, it engages the outer face of the locking portion 8 of the sealing part and, as the locking part cannot enter the head because of the contracted condition of the latter, the locking part is moved inwardly relative to the socket casing 1, against the pressure of the spring 9, until the head 12 of the stud passes through the aperture 2. The head then expands and engages back of the wall surrounding the aperture and the spring 9 then urges the locking portion 8 into engagement with the inwardly bent portions 18 of the head, thereby preventing contraction of the head or separation thereof from the socket by a strain on the curtain at three sides of the stud. The rounded head of the locking portion 8 also engages the end unlocking portion 19ª of the lever 19 and urges it inwardly relative to the socket-engaging part 11, thus moving the depending finger part 20 of the lever 19 against the outer face of the curtain 10, as illustrated in Fig. 2.

The preferred mode of separating the stud from the socket is by grasping the lower free edge of the curtain 10 and exerting a slight outward pull thereon, as illustrated in Fig. 3. Thus the curtain moves the depending finger 20 toward the front plate 13, thereby tipping the lever 19 about its pivot to urge the unlocking portion toward the locking portion 8 to move it out of engagement with the inwardly bent portions 18 and permit contraction of the head 12 of the stud. So far, there has been no relative tipping movement of the parts of the stud relative to the socket except the lever. Further pull upon the curtain 10 tips the stud, from the position shown in Fig. 3, out of engagement with the socket.

The lever, operable by a pull on the curtain, thus constitutes a preferred form of means, operable by an initial movement of the curtain relative to the rest of the stud, for moving the locking member out of engagement with the stud.

The stud, as shown, is inexpensive and easy to assemble to a curtain inasmuch as the lever 19, front plate 13 and socket-engaging part 11 are assembled as a unit at the point of manufacture.

While I have shown and described a preferred form of one embodiment of my invention, it will be understood that changes, involving omission, substitution, alteration and reversal of parts, and even changes in the mode of operation, may be made without departing from the scope of my invention, which is best defined in the following claims.

I claim:

1. A separable fastener including a socket element and a stud element secured to separate supports, one of said elements being secured to a flexible support, axially movable locking means for locking said stud and socket together, and lock displacing means shiftable relative to the fastener element secured to the flexible support and presenting a portion cooperating with the flexible support in such a manner that initial movement of said flexible support relative to the fastener element secured thereto will operate said lock displacing means and displace said locking means to permit separation of the stud and socket, said locking means and lock displacing means forming parts of the fastener assembly.

2. A separable fastener including a socket element and a stud element secured to separate supports, one of said elements being secured to a flexible support, locking means for securing said stud and socket together and a casing forming part of the fastener element secured to the flexible support, a lever pivoted in said casing, said locking means forming part of the fastener assembly, said lever presenting a depending portion located in a plane parallel to and adjacent to the flexible support and also being provided with means for operation of the locking means, whereby initial movement of said flexible support relative to the fastener element secured thereto operates said lever and displaces said locking means, thereby permitting separation of said stud and socket.

3. A separable fastener comprising, in combination, a socket presenting a stud-receiving aperture, a cooperating stud having a contractible and expansible socket-engaging head for engagement in said aperture, a locking part forming part of the fastener assembly for engagement with said head to prevent contraction thereof when engaged in said aperture, attaching means for securing said stud to a flexible support, releasing means pivoted upon said attaching means, said releasing means having a depending finger portion operable by initial movement of the flexible support relative to said attaching means, whereby said releasing means is operated to shift said locking means and permit contraction of said head and separation thereof from said socket.

4. A separable fastener comprising, in combination, a socket presenting a stud-receiving aperture, a cooperating stud having a contractible and expansible socket-engaging head for engagement in said aperture, a spring-pressed locking part assembled as a part of said socket for engagement with said head to prevent contraction thereof when engaged in said aperture, attaching means for securing said stud to a flexible support, releasing means pivoted upon said attaching means, said releasing means having a depending finger portion operable by initial movement of the flexible support relative to said attaching means, whereby said releasing means is operated to shift said locking means and permit contraction of said head and separation thereof from said socket.

5. A separable fastener comprising, in combination, a socket presenting a stud-receiving aperture, a cooperating stud having a contractible and expansible socket-engaging head for engagement with said aperture, a spring-pressed locking part located in said socket for engagement with said head to prevent contraction thereof when engaged in said aperture, attaching means for securing said stud to a flexible support, and a lever pivoted upon said attaching means, said lever being provided with an unlocking portion adapted to displace said locking means from said head to permit contraction thereof and disengagement from said socket.

6. A separable fastener comprising, in combination, a flush type socket presenting a stud-receiving aperture, a cooperating stud secured to a flexible stud-carrying curtain, a spring-pressed locking member in said socket for locking the head of said stud in said aperture, and a lever pivoted upon said stud at that side of the curtain opposite the side adjacent the socket, said lever being provided with an unlocking portion and being operative by an initial pull upon the lower edge of said curtain to move said locking member out of engagement with said stud, thereby to permit tipping of said stud out of engagement with said socket.

7. A separable fastener comprising in combination a stud member and a socket member, said socket member being provided with a stud receiving aperture, and said stud member having a head for entrance into said stud receiving aperture, locking means forming a part of the fastener assembly for locking the stud and socket against accidental separation, one of said fastener members being secured to a flexible support and having a casing located at the outer side of said flexible support, said casing having a front plate portion spaced from the flexible support, a movable finger assembled with said casing and extending laterally therefrom parallel to and adjacent the flexible support and confined for operation entirely between the front plate portion of the casing and the flexible support whereby said movable finger may be operated by pulling upon the flexible support adjacent to the movable finger, said finger having means extending therefrom at an angle relative thereto for operating said locking means when the flexible support is pulled adjacent to the said finger.

8. A separable fastener stud including a socket-engaging part having a base secured against the outer face of a stud-carrying medium and a socket engaging portion passing through the carrying medium, a front plate secured to said socket-engaging part, said plate being spaced away from the outer face of the stud-carrying medium, and a fastener unlocking element having a finger extending laterally outwardly from between said front plate and said base for operation in the space between said front plate and said stud-carrying medium.

9. A stud for a separable fastener including a socket-engaging part having a base plate, a front plate secured to said base plate, means for spacing said base plate and front plate relative to each other, a lever pivoted between said front plate and said base plate, said lever presenting a finger extending laterally outwardly through an opening between said plates, and said finger being operable between the planes of said plates for tipping said lever about its pivot.

10. A fastener comprising, in combination, a flush type socket for attachment to a rigid socket-carrying medium, a stud for attachment to a flexible carrying medium, shiftable locking means carried by said socket, resilient means urging said locking means into locking position, and releasing means forming part of the fastener assembly for shifting said locking means into unlocked position, said releasing means including a part projecting laterally from one side of the stud assembly, said part being shiftable by initial flexing of the flexible carrying medium relative to the stud to operate said releasing means.

11. A fastener comprising, in combination, a flush type socket for attachment to a rigid socket-carrying medium, a stud for attachment to a flexible carrying medium, axially shiftable locking means, resilient means urging said locking means into locking position, and releasing means for shifting said locking means into unlocked position, said locking means, resilient means and releasing means forming parts of the fastener assembly, said releasing means including a part projecting laterally from one side of the stud assembly, said part being shiftable by initial flexing of the flexible carrying medium at one side of said stud to operate said releasing means.

12. A separable fastener stud comprising as a unit, before assembly to a support, a contractible and expansible socket-engaging part having a base plate, a front plate secured to said base plate and spaced therefrom and a lever pivoted between said front plate and said base plate, said lever presenting a notch at either side edge thereof for engagement with bearings provided by one of said plates to maintain said lever in a predetermined relation to said front plate and said base, while permitting pivotal movement relative thereto.

13. A separable fastener stud comprising as a unit, before assembly to a support, a contractible and expansible socket-engaging part having a base, a front plate secured to said base and spaced therefrom and a lever pivoted between and extending laterally from between said front plate and said base, said lever presenting means for engagement with a bearing provided between said front plate and said base by which said lever is maintained in a predetermined relation to said front plate and said base while permitting pivotal movement relative thereto.

14. A separable fastener including a socket element and a stud element secured to separate supports, said stud element secured to a flexible support, a follower in the socket for engagement with the stud to lock the stud and socket together and a lever pivoted upon said stud element and provided with means for moving said follower out of engagement with said stud by initial movement of said flexible support relative to the stud, thereby to permit separation of the stud and socket by a continued pull exerted upon the flexible support.

15. A separable fastener comprising, in combination, a socket presenting a stud-receiving aperture, a cooperating stud secured to a flexible fabric and presenting contractible and expansible means for engagement with a wall surrounding said aperture, a spring-pressed axially movable locking member for engagement with said contractible and expansible means to prevent contraction thereof, thereby locking said stud and socket together, a laterally projecting finger located at one side of the stud and pivoted thereon and a lock-engaging portion provided by said pivoted finger for operation of said locking member by an initial pull on the flexible fabric to tip said finger relative to said stud prior to tipping said stud out of engagement with said socket, said locking member and said finger forming parts of the fastener assembly.

16. A separable fastener including a socket member having a stud receiving aperture, a cooperating stud secured to a flexible carrying medium and having a casing located at one side of the carrying medium, said casing having a plate portion spaced from the carrying medium, locking means forming part of the fastener assembly for locking the stud and socket together, releasing means assembled with the casing to provide a part of the stud assembly, said releasing means having a finger portion extending laterally from said casing close to the flexible carrying medium in a plane substantially parallel therewith and being confined for operation entirely within the space between the carrying medium and the plate of the said casing whereby said finger portion may be operated by an initial pull exerted upon the lower edge of the carrying medium to act upon said finger, thereby operating said releasing means to move said locking means out of locking position and permit separation of the fastener and said releasing means also including a portion extending from said finger at an angle to act upon the locking means.

In testimony whereof, I have signed my name to this specification.

DIDRICK DYRESEN.